US012088171B2

(12) United States Patent
Yin (10) Patent No.: US 12,088,171 B2
(45) Date of Patent: Sep. 10, 2024

(54) HEAT DISSIPATION METHOD FOR COMPLETE GENERAL-PURPOSE MACHINE

(71) Applicant: Dengchang Yin, Chongqing (CN)

(72) Inventor: Dengchang Yin, Chongqing (CN)

(73) Assignee: Dengchang Yin, Chongqing (CN)

(*) Notice: Subject to any disclaimer, the term of this patent is extended or adjusted under 35 U.S.C. 154(b) by 16 days.

(21) Appl. No.: 18/314,031

(22) Filed: May 8, 2023

(65) Prior Publication Data

US 2023/0353008 A1 Nov. 2, 2023

Related U.S. Application Data

(63) Continuation of application No. PCT/CN2021/129845, filed on Nov. 10, 2021.

(30) Foreign Application Priority Data

Nov. 10, 2020 (CN) .......................... 202011244280.2

(51) Int. Cl.
*H02K 5/20* (2006.01)
*F02B 63/04* (2006.01)
*F02B 63/06* (2006.01)
*H02K 7/18* (2006.01)
*H02K 9/06* (2006.01)
*H02K 11/05* (2016.01)

(52) U.S. Cl.
CPC .......... *H02K 5/207* (2021.01); *F02B 63/044* (2013.01); *F02B 63/06* (2013.01); *H02K 7/1815* (2013.01); *H02K 9/06* (2013.01); *H02K 11/05* (2016.01)

(58) Field of Classification Search
CPC ........ H02K 5/207; H02K 7/1815; H02K 9/06; H02K 11/05; H02K 5/20; H02K 5/04; H02K 9/04; F02B 63/044; F02B 63/06; F02B 63/04; F02B 63/048
See application file for complete search history.

(56) References Cited

U.S. PATENT DOCUMENTS 11,402,125 B1 * 8/2022 Jones ...................... F24H 3/002

FOREIGN PATENT DOCUMENTS

| CN | 203867943 U | 10/2014 |
|---|---|---|
| CN | 205921505 U | 2/2017 |
| CN | 217159387 U | 8/2022 |

* cited by examiner

*Primary Examiner* — Xiao En Mo
(74) *Attorney, Agent, or Firm* — Nitin Kaushik (57) ABSTRACT

The present invention relates to the technical field of heat dissipation of a complete general-purpose machine, comprising: dividing an inner cavity of a housing of a general-purpose machine generator into a low-temperature zone and a high-temperature zone, wherein an end portion of the air deflector is close to a device mounted on the inner wall of the housing, and has a gap for communicating the low-temperature zone and the high-temperature zone with a component mounted on the inner wall of the housing, and guide the air flow to enter from an air inlet of the low-temperature zone of the housing to firstly flow through a heat-generating assembly located in the low-temperature zone, then enter from the gap into the high-temperature zone to flow through the heat-generating assembly located in the high-temperature zone, and then flow out from an air outlet to cool the internal members of the general-purpose machine generator.

10 Claims, 8 Drawing Sheets

HEAT DISSIPATION METHOD FOR COMPLETE GENERAL-PURPOSE MACHINE

CROSS-REFERENCE TO RELATED APPLICATIONS

The application claims priority to Chinese patent application No. 202011244280.2, filed on Nov. 10, 2020, the entire contents of which are incorporated herein by reference.

TECHNICAL FIELD

The present invention relates to the technical field of general-purpose machine cooling, in particular to a heat dissipation method for a complete general-purpose machine.

BACKGROUND

A general-purpose machine refers to a general-purpose machine equipped with an engine, which is powered by the engine to perform various functions, such as mounting a water pump to draw water, and mounting an electric motor for power generation to generate electricity. A general-purpose machine generator refers to a small portable generator constructed by mounting a power generation module at the output end of a general-purpose machine generator, and is generally for domestic use.

A conventional general-purpose machine generator is composed of an engine, a generator assembly, a control panel, a fuel tank, and other components. These components are generally packaged as a relatively sealed general-purpose machine with a housing, which is easy to carry, soundproof, beautiful, and safe. In order to save cost, it is unnecessary to package the housing, and it is commonly known as an open-rack general-purpose machine generator. The present application relates to a general-purpose machine generator packaged by a housing.

A conventional general-purpose machine generator having a housing, wherein the structure comprises a housing, a control panel is mounted on one end side of the housing, and a fuel tank, a controller, a rectifier bridge, an engine, a generator assembly and a muffler are further mounted inside the housing; an air inlet and an air outlet are also provided on the housing; in operation, air flow is generated from the air inlet by means of a hand-pulled tray fan and the generator fan of the engine, and air is introduced into the housing; and after cooling various components by the air flow entering the housing, the air flows out from the air outlet through the muffler.

Therefore, the conventional general-purpose machine generator has the following disadvantages: 1, for the current configuration, the various components are uniformly mounted inside the housing with the components being in a large space. Since the engine works to generate a large amount of heat, the generator also works to generate a large amount of heat. Although there are two fans for exhaust cooling, the complete cooling effect is poor, and the temperature in the whole case is high. At the same time, the effect of cooling in this way is also very poor, while the heat resistance of various components in the case is different, some components perform bad in dissipating heat, which will affect the running quality of the whole machine, even cause damage, and fail to work if the temperature is too high. 2. When mounting the muffler, the muffler cover plate is directly fixed to a mounting groove on the periphery of the air outlet of the mechanical housing by using a screw, and the muffler outlet end is directly abutted against the muffler cover plate to achieve sealing by means of elastic deformation, so that the structure is simpler and the mounting is more convenient. However, due to the manufacturing error of each component, batch error and aging shrinkage of the muffler guide rubber sleeve in the long-lasting high-temperature environment, it is easy to cause the muffler outlet end to abut and seal loosely and generate a gap, so that hot gas can easily escape from the gap back into the equipment cavity, not only heat backflow but also impact the original heat dissipation air flow in the normal path of the equipment cavity, while the adjacent position to the muffler is just the generator assembly position, and the poor heat dissipation of the generator assembly easily leads to failure and shortening of life.

SUMMARY

It is an object of the present invention to provide a heat dissipation method for a complete general-purpose machine to solve the problems set forth in the background art.

In order to achieve the above object, the present invention provides the following solution:

a heat dissipation method for a complete general-purpose machine, comprising: dividing an inner cavity of a housing of a general-purpose machine generator into a low-temperature zone and a high-temperature zone with at least one air deflector, wherein an end portion of the air deflector is close to a device mounted on the inner wall of the housing, and has a gap for communicating the low-temperature zone and the high-temperature zone with a component mounted on the inner wall of the housing, and guide the air flow to enter from an air inlet of the low-temperature zone of the housing to firstly flow through a heat-generating assembly located in the low-temperature zone, then enter from the gap into the high-temperature zone to flow through the heat-generating assembly located in the high-temperature zone, and then flow out from an air outlet to cool the internal members of the general-purpose machine generator.

Further, the device comprises a fuel tank, an end portion of the air deflector is close to the fuel tank and has a gap for communicating left and right sides with the fuel tank, the heat-generating assembly comprises a control panel, a controller, a rectifier bridge, an engine assembly and a generator assembly, an air inlet and an air outlet are provided on the housing, and an air flow is generated from the air inlet by means of a hand-pulled tray fan and a generator fan of the engine during operation to achieve air intake, the control panel, the controller, the rectifier bridge and a part of the fuel tank are mounted at one end of the low-temperature zone, the engine assembly, the generator assembly and another part of the fuel tank are mounted at one end of the high-temperature zone, and the width of the air deflector matches the width of the inner cavity of the housing in a front-rear direction and is integrally mounted in the housing in a vertical direction.

Further, the device further comprises mufflers, the ends of the air deflectors are close to the mufflers, and a gap is provided among the mufflers for communicating the left and right sides, the mufflers are mounted at the air outlets, the air flow entering the housing cools each component and then flows out from the air outlets through the mufflers, the control panel is mounted on a left end face of the housing, and the control panel air inlets are provided around the control panel as the primary air inlets, the controller and the rectifier bridge are vertically mounted on the lower bottom surface of the housing at the front end of the control panel air inlets in parallel in intervals, and the fuel tank is mounted and fixed on the top of the inner cavity of the housing opposite the controller, the rectifier bridge, the air deflector and the engine assembly.

Further, the air deflector is mounted at one side of the high-temperature zone with a surrounding spacer surrounding the engine assembly and the generator assembly.

Further, an air inlet of the controller rectifier bridge is further provided on a lower bottom surface of the housing where the controller and the rectifier bridge are located, and an air inlet of the engine generator assembly is further provided on the lower bottom surface of the housing where the engine assembly and the generator assembly are located as a secondary air inlet having an air intake area being smaller than that of a primary air inlet as a whole, and the left end and the upper end surface of the fuel tank are mounted at an interval from the inner cavity surface of the housing, the lower part of the right end of the fuel tank has a recess which is integrally recessed upwards and used for forming an air flow convergence zone chamber with a space expanding on the air flow path with the air deflector.

Further, the air deflector has a radiation proof material on its surface, and the radiation proof material is a felt composite aluminum foil thermal insulation mat.

Further, the engine assembly comprises an engine case horizontally provided on an inner bottom surface of the lower housing in the high-temperature zone, wherein the left end of the engine case is a hand-pulled tray fan, an air filter is provided below the hand-pulled tray fan, and a carburetor is provided above the hand-pulled tray fan.

Further, an engine cylinder head is provided on an upper part of the engine case, and a high-pressure pack is provided on the engine cylinder head.

Further, the generator assembly is provided at the right end of the engine case and comprises a generator shell with a left end butted to the right end face of the engine case and a generator fan, a generator rotor and a generator stator provided in the generator shell, and a generator air inlet is further provided at a position where the right end face of the housing faces the generator assembly; an air inlet of the generator achieves air intake through abutting a generator air guide port rubber sleeve and an opening at the right end of the generator shell; a grid-shaped generator air inlet cover plate is fixedly mounted at the generator air inlet by means of a screw, the left end of the generator air guide port rubber sleeve has a vertical generator abutting surface and abuts on the right end of the generator shell; the right end of the generator air guide port rubber sleeve has a vertical generator air inlet cover plate abutting surface and abuts on the left end of the generator air inlet cover plate, and the middle part of the generator air guide port rubber sleeve has a circle of convex projection.

Further, the generator assembly further comprises a generator fan provided within the generator shell at a left end of the generator rotor and the generator stator.

Compared with the prior art, the present invention has the beneficial effects that:
  according to the present invention, a partition part is added, relatively closed left and right cavities are formed on the left and right sides of the partition part, a controller and a rectifier bridge are in the left cavity (a controller cavity), and an engine is in the right cavity (an engine cavity), so that the heat radiation generated by the engine during operation is blocked by the partition part, and the radiation heat received by the controller, the rectifier bridge and the fuel tank is greatly reduced; at the same time, after the engine stops operating, the temperature of the engine region (the engine cavity) rises sharply due to the idle of fan and no air intake, and hot air in the engine region due to the partition part is difficult to generate convection with cold air in the controller cavity, the temperature of the controller cavity rises a little and the effect on the performance of the controller cavity is controllable.

According to the present invention, in order to reduce the influence of the heat radiation generated by the engine during operation on the components in the controller cavity, a radiation-proof material can be added to the partition part: i.e., a felt composite aluminum foil thermal insulation mat.

According to the present invention, in the case of a double-air duct generator, a partition part may be provided at a hand-pulled tray fan, a partition part may be provided at a generator fan, or a partition part may be mounted at each of the hand-pulled tray fan and the generator fan to change the air duct.

According to the present invention, in the case of a single-air duct generator, a partition part is provided at the hand-pulled tray fan, and since the single-air duct generator has a poor cooling effect on the engine, a fan can be added at the output end of the engine, air can be introduced or air can be discharged to the outside of the generator, and the partition part can be added after the fan is added.

The present invention has the advantages of better heat dissipation and cooling effect, improving the working stability of a general-purpose machine, and extending the service life of equipment.

Figure 1:
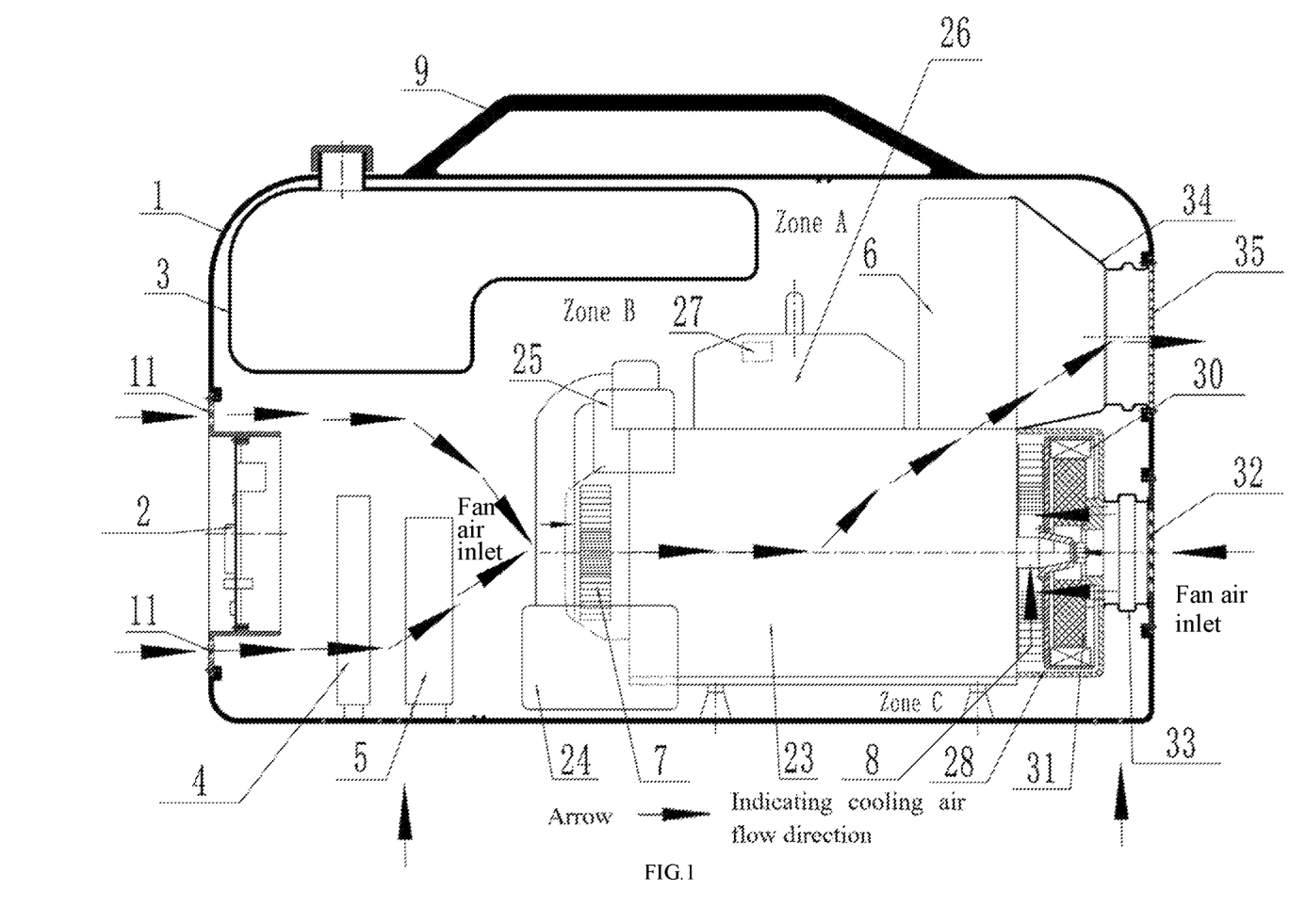
FIG. 1 is a structural schematic diagram of a double-air duct mute digital generator.

IN THE FIGURE 1-housing, 2-control panel, 3-fuel tank, 4-controller. 5-rectifying bridge, 6-muffler, 7-hand-pulled tray fan, 8-generator fan, 9-handle, 10-air deflector, 11-control panel air inlet, 12-controller rectifying bridge air inlet, 13-recess, 14-felt composite aluminum foil thermal insulation mat, 15-primary air guide port. 16-vertical section, 17-bent section, 18-horizontal section. 19-oblique section. 20-step, 21-secondary upper air guide port, 22-secondary upper air guide port, 23-engine case, 24-air filter, 25-carburetor, 26-engine cylinder head, 27-high-pressure pack. 28-generator shell. 30-generator rotor, 31-generator stator, 32-generator air inlet, 33-generator air guide port rubber sleeve, 34-muffler air guide port rubber sleeve, 35-muffler air outlet, 36-gap, 37-surrounding spacer, 38-motor air outlet, 39-engine generator assembly air inlet, 40-engine output end, 41-end fan.

Detailed Description of the Embodiments

The embodiments of the present invention will now be described more fully hereinafter with reference to the accompanying drawings, in which embodiments of the present invention are shown. It is to be understood that the embodiments described are only a few, but not all embodiments of the present invention. Based on the embodiments of the present invention, all other embodiments obtained by a person of ordinary skill in the art without inventive effort fall within the scope of the present invention.

In describing the present invention, the terms "upper end", "lower end", "inner", "outer", "front end", "rear end", "two ends", "one end", "the other end" and the like indicate orientations or positional relationships based on the orientation or positional relationships shown in the drawings, are merely for convenience in describing the present invention and to simplify the description, and do not indicate or imply that the devices or elements referred to must have a particular orientation, be constructed and operated in a particular orientation, and thus are not to be construed as limiting the present invention. Further, the terms "first" and "second" are used for descriptive purposes only and are not to be construed as indicating or implying relative importance.

In the description of the present invention, it should be noted that, unless expressly specified and limited otherwise, the terms "mounted". "provided", "sleeved", "sleeve connection", "connected", and the like, are to be construed broadly, e.g. "connected", either fixedly or detachably, or integrally; may be a mechanical connection or an electrical connection; it can be directly connected or indirectly connected through an intermediate medium, and can be the communication between two elements. The specific meaning of the above terms in the present invention can be understood in detail by a person skilled in the art.

With reference to FIGS. 1 to 8, the present invention provides a technical solution and a method for heat dissipation (improved) of complete general-purpose machine, and is specifically described as follows:

1. A general-purpose machine herein refers to a general-purpose machine equipped with an engine (also commonly known as power), which is powered by the engine to perform various functions, such as mounting a water pump to draw water, and mounting an electric motor for power generation to generate electricity (hereinafter referred to as an electric motor).
2. An engine is generally composed of two major mechanisms and five major systems, and a gasoline engine is composed of two major mechanisms and five major systems, i.e., a crank-connecting rod mechanism, a gas distribution mechanism, a fuel supply system, a lubrication system, a cooling system, an ignition system, and a starting system; the diesel engine is composed of two major mechanisms and four major systems, i.e. A crank and connecting rod mechanism, a gas distribution mechanism as well as a fuel supply system, a lubrication system, a cooling system and a starting system, and the diesel engines are operated by compression ignition and do not need an ignition system.
3. A cooling system having functions further divided into water cooling, air cooling and water cooling plus air cooling. What is described herein is how to change the air duct of a general-purpose machine equipped with an air-cooled engine (also referred to as an air-cooled engine, hereinafter referred to as an engine) to improve the heat dissipation effect of the complete general-purpose machine and achieve the effect of stable operation.
4. A general engine has an air inlet channel, and the corresponding components of the engine are cooled by the air inlet to ensure the normal operation of the engine; a fan is mounted at the air inlet channel, and the fan is commonly connected to an engine crank-connecting rod mechanism, and is generally at the end of a hand-pulled started tray end, i.e., a hand-pulled tray fan 7; in order to improve the heat dissipation of the engine, some general engines are mounted with a fan at the other end, and the heat dissipation of the engine and components such as a motor stator and rotor connected with the engine is also referred to as a generator fan 8.
5. The complete general-purpose machine (hereinafter referred to as general-purpose machine) is constructed by mounting the general-purpose machine engine and other parts corresponding to the requirements of the general-purpose machine together, and is divided into an open general-purpose machine and a closed general-purpose machine. The open general-purpose machine is constructed by mounting the general-purpose machine engine and other parts corresponding to the requirements of the general-purpose machine together with no enclosure (housing) sealed (opposite), the closed general-purpose machine has enclosure (housing) sealed (opposite), as well as also a semi-closed general-purpose machine (general-purpose machine has only part of the enclosure).
6. The heat dissipation method for a complete general-purpose machine is how to change the air passage of a closed general-purpose machine equipped with an air-cooled engine to improve the heat dissipation effect of the general-purpose machine, such as a digital generator, wherein the primary components of the digital generator are an engine (air-cooled), a motor stator and rotor (mounted on the engine), a fuel tank 3 (a fuel tank assembly), an inverter (or a controller 4 and a rectifier bridge 5), a control panel 2 (an electrical instrument panel) and a housing 1, and the device made of these components is referred to as a mute digital generator, and is referred to as an open digital generator without the housing, and the mute digital generator will be described below.
7. A structural schematic diagram of a mute digital generator is as shown in FIG. 1, the cooling air from two air ducts cools the generator, wherein the first way is to cool the control panel 2, the controller 4 and the rectifier bridge 5 with the air from the air inlet of the control panel 2, and the air is discharged into an engine case 23 via a hand-pulled tray fan 7 to cool the relevant parts of the engine, and then the air is discharged through the muffler air outlet 35. The other way is that the air enters from the motor air inlet (the generator air inlet 32) to cool the motor stator and the motor rotor, and is discharged into the engine case by the generator fan 8 to cool the relevant parts of the engine, and is then discharged through the muffler air outlet 35. This is known as double-air duct cooling, and such mute digital generator is hereinafter referred to as double-air duct mute digital generator. For this configuration, the cooling air has not been rerouted, some zones have become dead angle and thus is poorly cooled and still has high-temperature, such as zones A, B and C, which results in over high-temperature of some parts, such as a high-pressure pack 27 and a carburetor 25 in zone A, a fuel tank 3 in zone B and an engine component oil in zone C are at an over high-temperature, which adversely affects the long-term normal operation of the whole machine.

Figure 2:
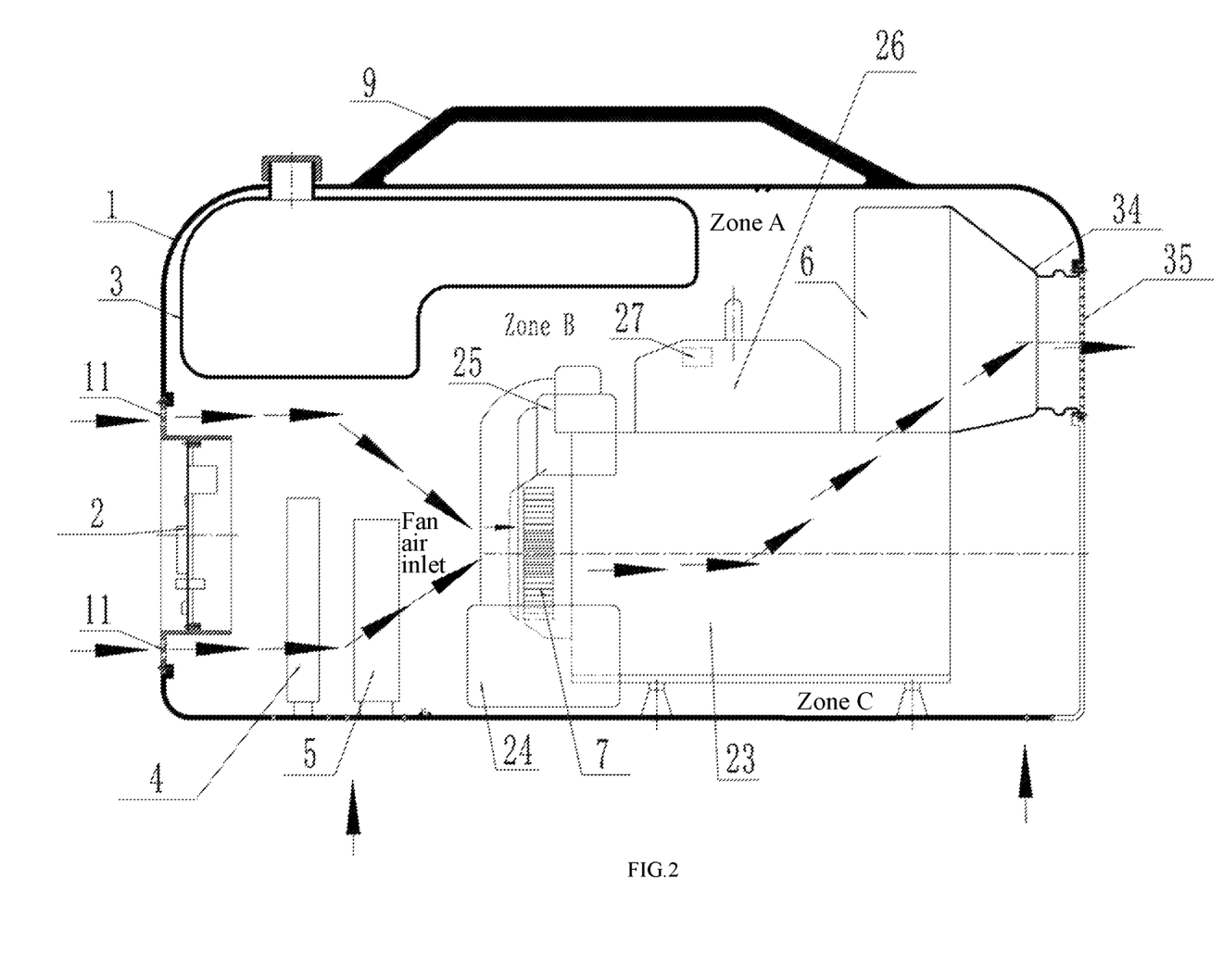
FIG. 2 is a structural schematic diagram of a single-air duct mute digital generator.

8. A structural schematic diagram of a mute digital generator is as shown in FIG. 2, the cooling air cools the mute digital generator from an air duct (the motor stator and the motor rotor are mounted on a hand-pulled tray end). The cooling air enters the air from the control panel 2 to cool the control panel 2, the controller 4 and the rectifier bridge 5, and is discharged through the hand-pulled tray fan 7 to cool the motor stator and the motor rotor, and passes through the engine case 23 to cool the relevant parts of the engine and is discharged through the muffler air outlet 35. This is known as single-air duct cooling, and such mute digital generator is hereinafter referred to as single-air duct mute digital generator. For this configuration, the cooling air has not been rerouted, some zones have become dead angle and thus is poorly cooled and still has high-temperature, such as zones A, B and C, which results in over high-temperature of some parts, such as a high-pressure pack 27 and a carburetor 25 in zone A, a fuel tank in zone B and an engine component oil in zone C are at an over high-temperature, which adversely affects the long-term normal operation of the whole machine. Single-duct cooling is not as good as double-air duct cooling, for example, the temperature of the engine oil is higher than that of the double-air duct, but the single-air duct engine is lighter and costs less, and therefore is commonly used.

9. At present, all the mute digital generator structures are similar to those in FIG. 1 (known as a double-air duct mute digital generator) and FIG. 2 (a single-air duct mute digital generator). An engine is provided as a body, the remaining components are sequentially placed at the periphery of the engine, the cooling air enters from an air inlet 11 of a control panel to cool the components such as a controller 4 and a rectifier bridge 5, and is directly discharged from a hand-pulled tray fan 7 to cool the engine and relevant parts thereof, and then is discharged from a muffler air outlet 35 via a muffler 6. In FIG. 1, the components of a double-air duct mute digital generator such as a motor stator and a motor rotor are cooled by the cooling air from a motor air inlet (i.e., a generator air inlet 32), then is discharged into an engine case by a generator fan 8 to cool relevant parts of the engine, and then is discharged from the muffler air outlet 35 via the muffler 6.

As shown in FIGS. 1 and 2, the engine in the mute digital generator is a primary component and is a primary heating body, wherein the cooling air discharged into the hand-pulled tray fan 7 and the generator fan 8 of the engine (hereinafter referred to as a double-air duct engine) in the double-air duct mute digital generator is discharged from the muffler air outlet 35 via the muffler 6 after cooling the engine and relevant parts, and the double-air duct engine is semi-sealed (mainly covering to seal the primary heating component with a plastic part to form a cooling air duct, and the cooling air discharged into the hand-pulled tray fan 7 cools the component and is then discharged from the muffler air outlet 35). The engine case 23 and other components such as the carburetor 25 and the high-pressure pack 27 are not sealed and are exposed outside the seal; the engine generates heat radiation in the housing 1 and heats all the components and air in the mute digital generator, which is the primary reason for the temperature rise of all the components in the mute digital generator; at the same time, a gap is formed during the semi-sealed assembly; a part of hot gas flows into the housing 1 to cause the temperature rise in the housing, but has a small effect on the temperature rise of all the components in the mute digital generator; since the engine and the housing 1 are coupled via a rubber damping pad, the heat conduction is too little to be countable. The engine in the single-air duct mute digital generator (hereinafter referred to as single-air duct engine) is fully sealed (mainly sealing most parts of the engine using plastic parts to form an air-cooling duct of the engine, and the cooling air discharged by the hand plate fan 7 cools the most parts of the engine and is then discharged via the muffler air outlet 35). The temperature rise mode of the single-air duct engine for all parts in the mute digital generator is the same as that of the double-air duct engine, only because the engine is covered by fully sealed parts, the temperature rise of all the parts in the mute digital generator is slower.

The engine component in the mute digital generator is the primary heating body, and the motor (mainly composed of the motor stator and the motor rotor) also has great heat generation. In general, in the case of a single-air duct engine, the motor is mounted at the hand-pulled tray fan 7 by which heat is dissipated. In the case of a double-air duct engine, the generator is mounted at the hand-pulled tray fan 7, and the generator motor is mounted at the generator fan 8 to be dissipated heated by two fans.

Heat is generated in the operation of the controller 4 and the rectifier bridge 5 (or an inverter) in the mute digital generator, and since the heat generation affects the working performance and service life thereof, when the complete machine is assembled, they are placed in front of the hand-pulled tray fan 7, and air is fed from the control panel 2 to cool the same to meet the working requirements.

The mute digital generator takes the engine as the body, the other parts are sequentially placed at the periphery of the engine, the heat-generating parts are placed at the air inlet (or an air outlet) for cooling, and the other parts are placed at the periphery, so that the air inlet and outlet path in the mute digital generator is simple; air enters the air inlet to cool the heat-generating parts and cool the relevant parts of the engine via the engine case 23, then the air is discharged via the muffler air outlet 35, and the air inlet and outlet path is basically a straight line (hereinafter referred to as a linear air path).

As is known from the above, the high-temperature inside the housing of the mute digital generator housing is mainly generated by the heat radiation of the engine components, and although the generator and the inverter (or the controller 4 and the rectifier bridge 5) also generate heat, the heat is dissipated when they are placed on the linear air path. It is impossible to provide all the parts on the linear air path in the mute digital generator, so when the mute digital generator is working, the temperature of the parts which are not provided on the linear air path increases due to no (or little) cooling by the cooling air, and the temperature of the fuel tank 3 as shown in FIGS. 1 and 2 is high, and at the same time, a dead angle is formed in the local zone of zones A, B and C as shown in the mute digital generator with no cooling air (or little cooling air) to pass through, and the temperature of the air in these zones and the temperature of the parts are high, and only the heat dissipation on the outer surface of the housing 1 reaches a thermal balance, which in turn makes the heat dissipation of the engine poor and the temperature increases. In order to solve this problem, some manufacturers perforate a ventilation hole on the outer surface of the housing (generator shell 28) of the mute digital generator case, and this problem can certainly be improved, but cannot be completely solved (for example, the temperature of the carburetor is high); meanwhile, opening a ventilation hole on the outer surface of the casing 1 would damage the outer surface of the housing, unaesthetic, increase the amount of noise, change the flow direction of the cooling air in the casing 1, reduce the air to the air inlet of the control panel 2, and deteriorate the cooling of the inverter (or the controller 4 and the rectifier bridge 5), which adversely affects the performance thereof.

Figure 3:
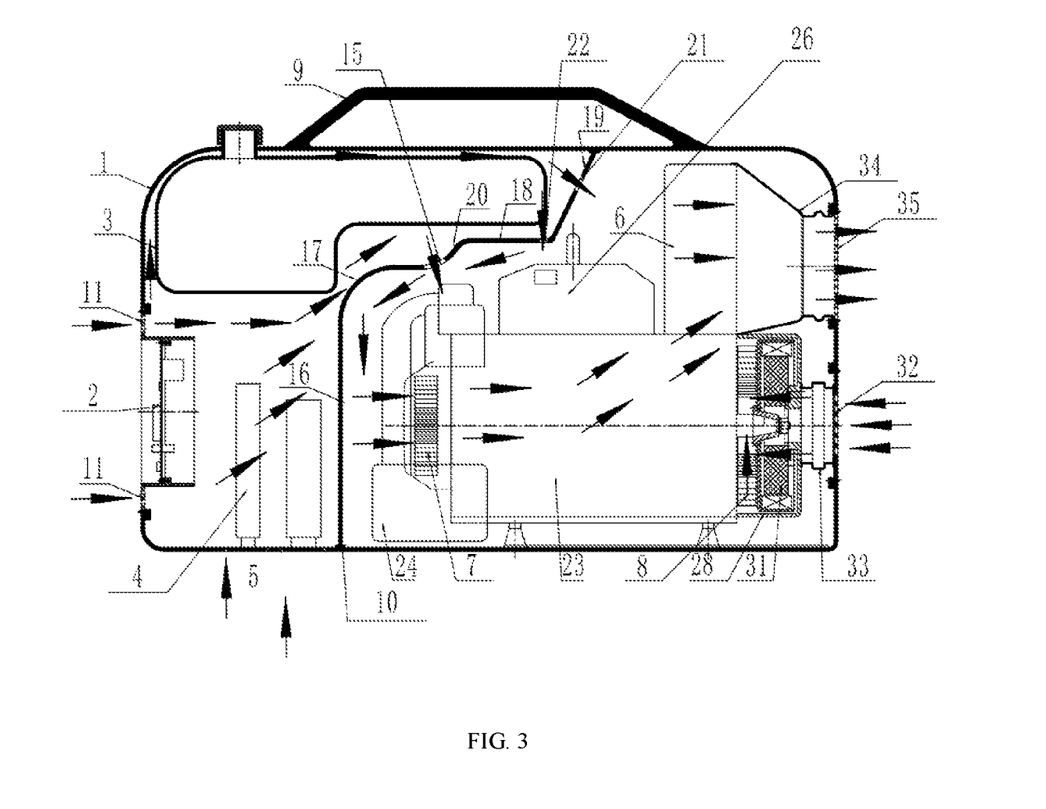
FIG. 3 is a structural schematic diagram of FIG. 1 added with a partition part.
Figure 4:
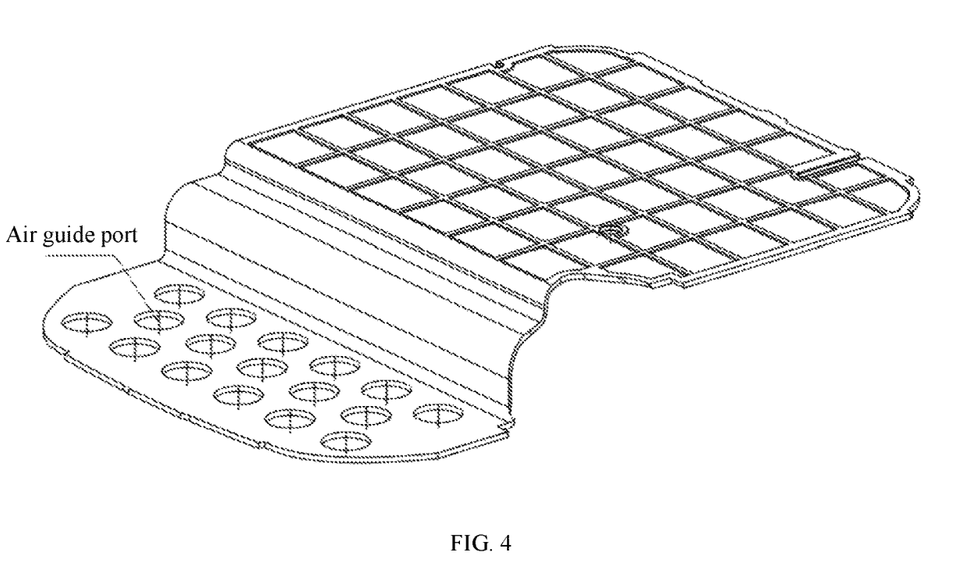
FIG. 4 is a structural schematic diagram of the partition part (before modification).

10. In order to solve the above-mentioned problem 9, as shown in FIG. 3, a partition part (i.e., an air deflector 10) as shown in FIG. 4 is added at the air inlet of the fan, the housing 1 of the general-purpose machine is partitioned into two zones, the rectifying bridge 5 and the engine are separated from the air inlet of the fan, and the partition part is provided with an air guide port. As shown in FIG. 3, after adding a partition part, air is introduced from the air inlet 11 of the control panel to cool the heat-generating parts, and then blocked by the partition part, the cooling air direction changes, and the linear air path is changed; the air direction changes from horizontal to upward when the air enters to meet the cross section of the partition part, the air flows out through the air guide port to cool the tail part of the fuel tank 3, the high-pressure pack 27 and the carburetor 25, etc. and then the air is sucked away by the hand-pulled tray fan 7 of the engine.

The lower end of the air deflector has a vertically provided vertical section 16, the height of the vertical section 16 matches the height of the engine assembly, the upper end of the vertical section 16 is connected to a horizontal section 18 via an integral rightward bent portion 17, and the right end of the horizontal section 18 is connected to a rightward upper oblique section 19.

In this way, it is possible to isolate the fuel tank more scientifically and reasonably from the engine assembly, while better guiding the air flow in the left and right zones.

The air deflector 10 may be an injection molded part. This makes it easy to manufacture and has both sufficient strength and some elasticity. The air deflector 10 is also bent at a position between the bent portion 17 and the horizontal section 18 to form a step 20 to the upper right, and the primary air duct 15 is located at a bent position below the step.

A secondary upper air guide port 21 is further provided at an upper position in the upper oblique section 19 of the air deflector 10, and the perforation area of the secondary upper air guide port 21 is smaller than that of the primary air guide port 15. Further, the rightmost end of the upper horizontal section of the air deflector near the oblique section is further provided with a secondary lower air guide port 22, wherein the secondary lower air guide port 22 has a smaller perforation area than the primary air guide port 15.

The presence of the two secondary air guide ports, which form the air outlet of the secondary air flow path in the low-temperature zone (especially the presence of the secondary upper air guide ports), can better guide the formation of the secondary air flow path in the low-temperature zone, so that a part of the air flow travels over the fuel tank and between the fuel tanks to better achieve the cooling of the fuel tank. Secondly, the positions of the two secondary air guide ports (especially the secondary lower air guide port) and the primary air guide port are close to each other and open in a downward direction, so that a part of the air flow entering the high-temperature zone from the secondary air guide port will impact and guide the air flow entering the high-temperature zone from the primary air guide port to flow downward first to achieve better cooling of the engine from the beginning to the end and improve the cooling effect of the engine. In order to avoid the disadvantage that the air intake is not conducive to engine cooling after the primary air inlet is provided high due to the need to guide the air flow path in the low-temperature zone. In addition, the presence of the air inlets further enables components of the engine assembly which are not resistant to high-temperatures to be provided directly opposite the air guide port where the air enters to achieve targeted cooling and improve the complete cooling effect. Therefore, the shape structure of the air deflector and the arrangement structure of each air guide port on the air deflector can comprehensively achieve the best complete cooling effect by considering the respective air flow conditions in the low-temperature zone and the high-temperature zone on both sides of the spacer.

Figure 5:
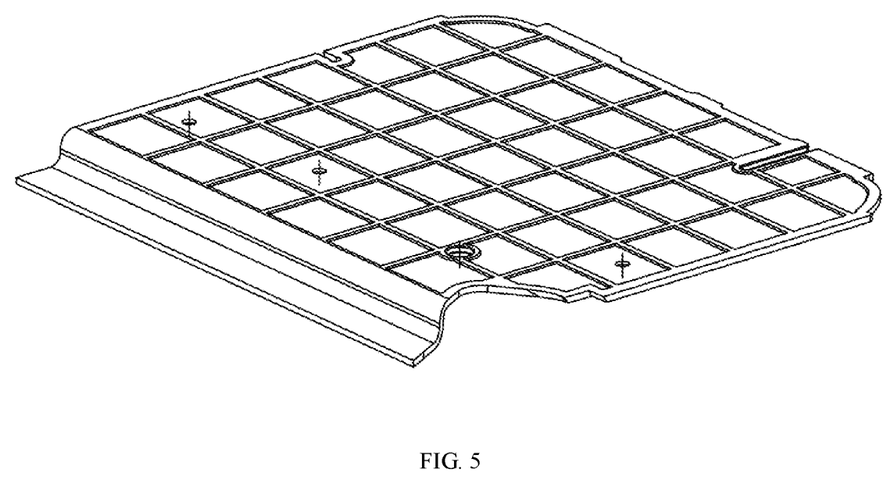
FIG. 5 is a structural schematic diagram of the partition part according to the present invention.
Figure 6:
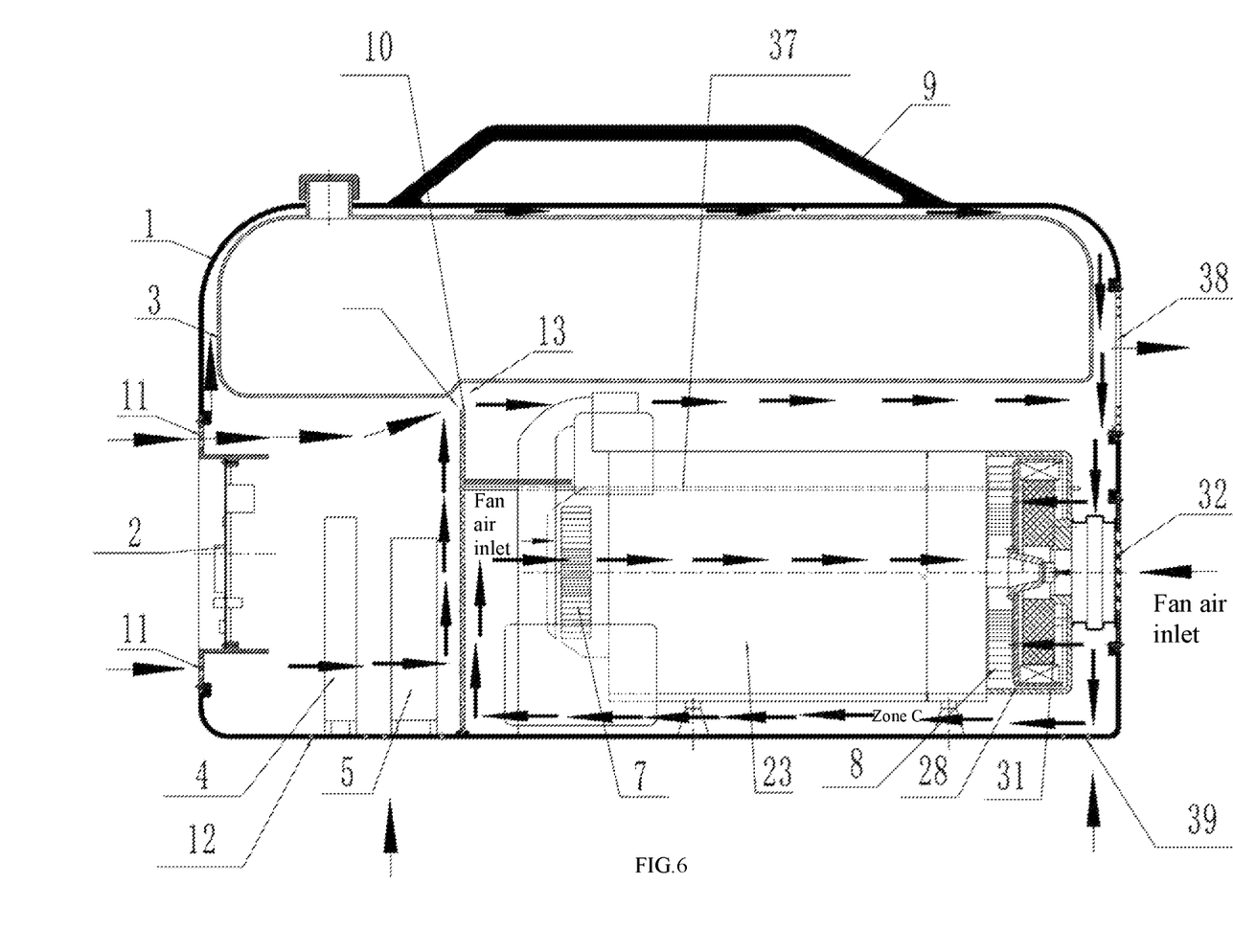
FIG. 6 is a structural schematic diagram of a double-air duct mute digital generator according to the present invention, in which the partition part of FIG. 5 is mounted and the muffler is omitted.
Figure 7:
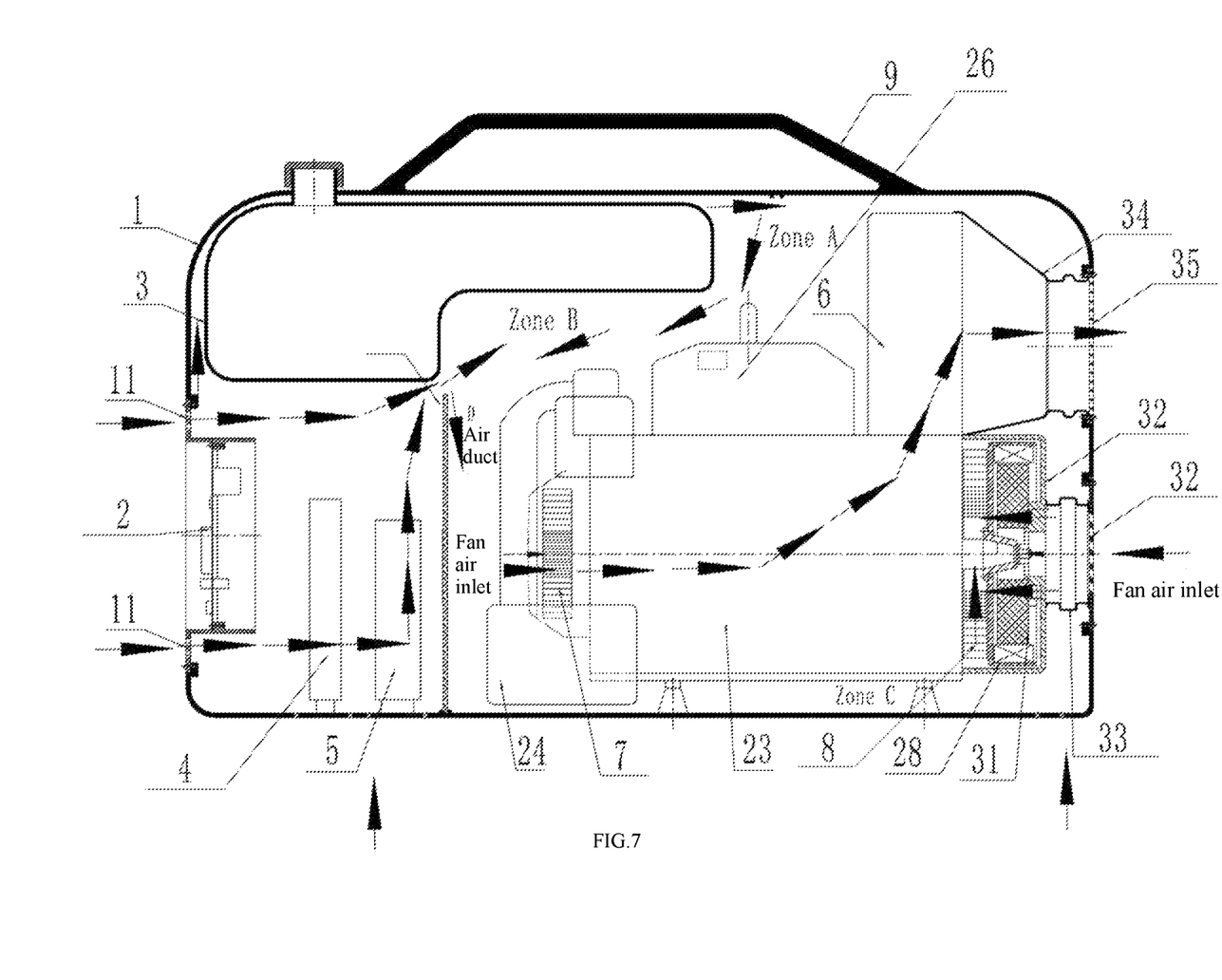
FIG. 7 is a structural schematic diagram of a double-air duct mute digital generator according to the present invention without omitting a muffler after mounting the partition part of FIG. 5.
Figure 8:
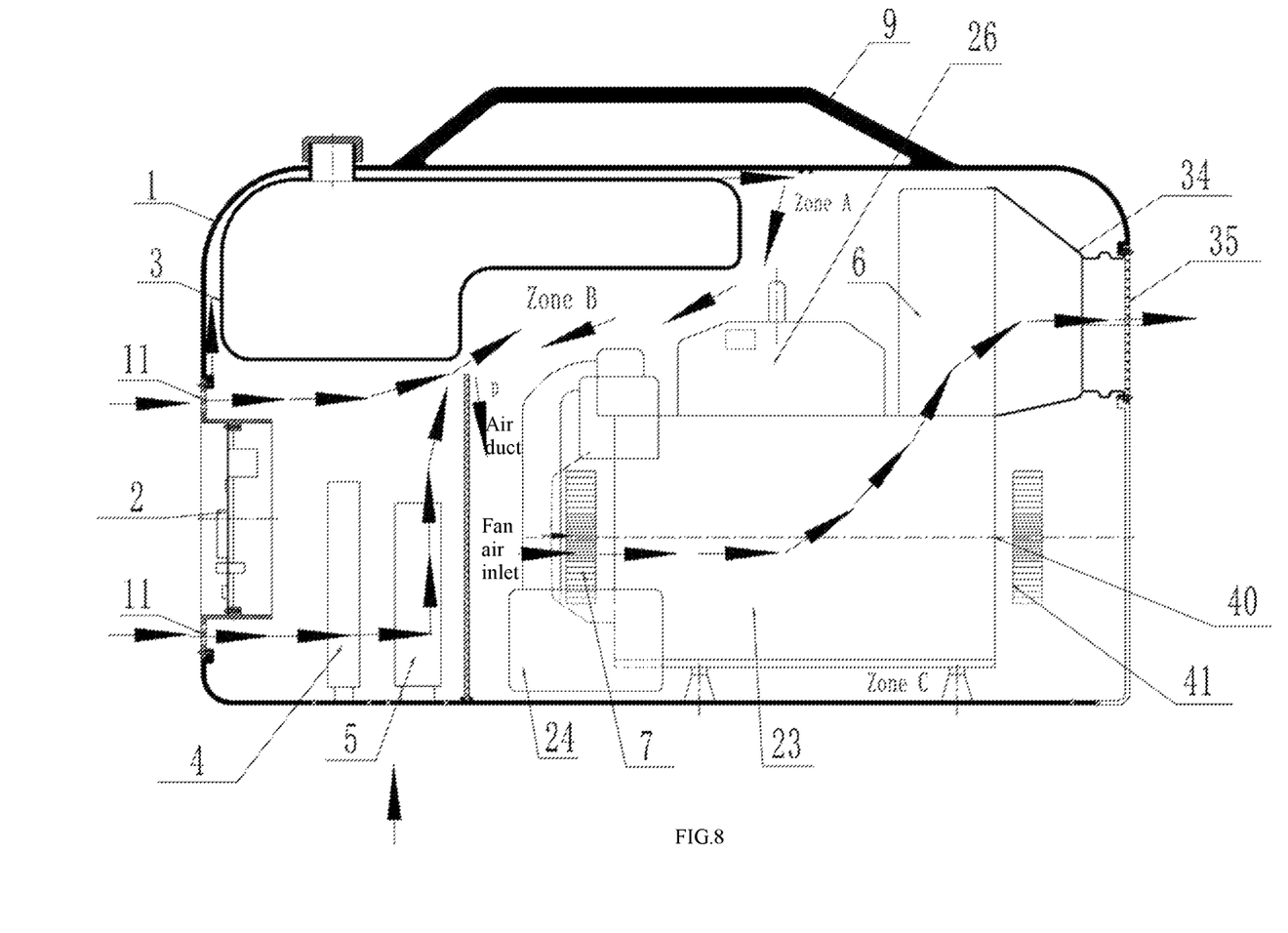
FIG. 8 is a structural schematic diagram of a single-air duct mute digital generator according to the present invention without omitting a muffler after mounting the partition part of FIG. 5.

11. In an embodiment of the invention, a further improvement is: in practical use, in order to facilitate the mounting of the partition part (the air deflector 10), the design of the partition part is simplified as much as possible on the premise of achieving the function of the partition part; as shown in FIG. 5, after being mounted on the generator, as shown in FIGS. 6, 7 and 8, a fuel tank 3 is provided at the top of the partition part, and a housing 1 is provided at the top of the fuel tank 3, and the bottom and left and right of the partition part are in contact with the bottom plate of the housing 1 and the left and right sides of the housing 1 (i.e., the bottom of the partition part is in contact with the bottom plate of the housing 1, and the left and right of the partition part are in contact with the left and right sides of the housing 1), and are relatively sealed (the joint of each part is allowed to have a gap, but the size of the gap is well controlled and cannot affect the improved air duct performance), so the air duct can be changed. Cooling air is left on the top of the partition part and the bottom of the fuel tank through a gap 36/notch, i.e., an air guide port (hereinafter referred to as an air guide port), wherein the air guide port is adjusted in size and direction according to the condition of the whole machine, and one or more air guide ports can be provided, so that the controller 4 and the rectifier bridge 5 are cooled by changing the air inlet of the air duct and then flow out from the gap 36 to cool the fuel tank 3, wherein a gap is left on the top of the fuel tank 3 and the housing 1 in the figure, and the cooling air flows through the gap to cool the top of the fuel tank 3. In FIG. 6, the muffler 6 is omitted so that the air cooling the relevant parts of the engine is discharged through the motor air outlet 38.

12. As shown in FIG. 7, a partition part is added, relatively closed lefl and right cavities are formed on the left and right sides of the partition part, the controller 4, the rectifier bridge 5 are in the left cavity (the controller cavity), and the engine is in the right cavity (the engine cavity), so that the heat radiation generated by the engine during operation is blocked by the partition part (the partition part 10), so that the radiation heat received by the controller 4, the rectifier bridge 5 and the fuel tank 3 is greatly reduced, and at the same time, after the engine stops operating, since the fan stops rotating, there is no air intake, the temperature of the engine region (the engine cavity) rises sharply, due to the partition part, it is difficult for the hot air in the engine zone to convect with the cold air in the controller cavity, and the temperature rise of the controller cavity is very small, which has a controllable effect on the performance of the controller cavity.

13. In order to reduce the influence of the heat radiation generated by the engine during operation on the components in the controller cavity, a radiation-proof material can be added to the partition part: i.e., a felt composite aluminum foil thermal insulation mat 14.

14. The material of the partition part can be plastic, metal or other materials, the partition part can be a straight plate, can be made into various shapes according to requirements, and the air guide port can also be a hole perforated in the partition part.

15. The partition part can be a single part or a combination of several parts (newly added parts), and other parts (such as the rectifier bridge 5, etc.) can be modified, and a part or several parts can be modified to achieve the effect of the partition part.

16. The double-air duct generator shown in FIG. 7 may be provided with a partition part at the hand-pulled tray fan 7, a partition part at the generator fan 8 (not described herein), or a partition part at each of the hand-pulled tray fan 7 and the generator fan 8 (not described herein) to change the air duct.

17. As shown in FIG. 8, the generator with a single-air duct has a partition part at the hand-pulled tray fan. Since the single-air duct has a poor cooling effect on the engine, an end fan 41 can be added at the output end 40 of the engine, and air can be supplied or discharged to the outside of the generator (not described herein), the partition part can be added after the end fan 41 is added, and the arrangement of the partition part can be described with reference to the above-mentioned items. The generator assembly is omitted from FIG. 8.

The remaining non-recited portions of the present invention are referred to as the prior art.

While embodiments of the present invention have been shown and described, it will be understood by a person skilled in the art that various changes, modifications, substitutions, and alterations may be made herein without departing from the principles and spirit of the present invention, the scope of which is defined by the appended claims and their equivalents.

What is claimed is:

1. A heat dissipation method for a complete general-purpose machine, comprising: dividing an inner cavity of a housing (1) of a general-purpose machine generator into a low-temperature zone and a high-temperature zone with at least one air deflector (10), wherein an end portion of the air deflector (10) is close to a device mounted on the inner wall of the housing (1), and has a gap (36) for communicating the low-temperature zone and the high-temperature zone with a component mounted on the inner wall of the housing (1), and guide the air flow to enter from an air inlet of the low-temperature zone of the housing (1) to firstly flow through a heat-generating assembly located in the low-temperature zone, then enter from the gap (36) into the high-temperature zone to flow through the heat-generating assembly located in the high-temperature zone, and then flow out from an air outlet to cool the internal members of the general-purpose machine generator.

2. The method according to claim 1, wherein the device comprises a fuel tank (3), an end portion of the air deflector (10) is close to the fuel tank (3) and has a gap (36) for communicating left and right sides with the fuel tank (3), the heat-generating assembly comprises a control panel (2), a controller (4), a rectifier bridge (5), an engine assembly and a generator assembly, an air inlet and an air outlet are provided on the housing, and an air flow is generated from the air inlet by means of a hand-pulled tray fan (7) and a generator fan (8) of the engine during operation to achieve air intake, the control panel (2), the controller (4), the rectifier bridge (5) and a part of the fuel tank (3) are mounted at one end of the low-temperature zone, the engine assembly, the generator assembly and another part of the fuel tank (3) are mounted at one end of the high-temperature zone, and the width of the air deflector (10) matches the width of the inner cavity of the housing (1) in a front-rear direction and is integrally mounted in the housing (1) in a vertical direction.

3. The method according to claim 2, wherein the device further comprises mufflers (6), the ends of the air deflectors (10) are close to the mufflers (6), and a gap (36) is provided among the mufflers (6) for communicating the left and right sides, the mufflers (6) are mounted at the air outlets, the air flow entering the housing (1) cools each component and then flows out from the air outlets through the mufflers (6), the control panel (2) is mounted on a left end face of the housing (1), and the control panel air inlets (11) are provided around the control panel (2) as the primary air inlets, the controller (4) and the rectifier bridge (5) are vertically mounted on the lower bottom surface of the housing (1) at the front end of the control panel air inlets (11) in parallel in intervals, and the fuel tank (3) is mounted and fixed on the top of the inner cavity of the housing (1) opposite the controller (4), the rectifier bridge (5), the air deflector (10) and the engine assembly.

4. The method according to claim 2, wherein the air deflector (10) is mounted at one side of the high-temperature zone with a surrounding spacer (37), and the surrounding spacer (37) surrounds an engine assembly and a generator assembly.

5. The method according to claim 2, wherein an air inlet (12) of the controller rectifier bridge is further provided on a lower bottom surface of the housing (1) where the controller (4) and the rectifier bridge (5) are located, and an air inlet (39) of the engine generator assembly is further provided on the lower bottom surface of the housing (1) where the engine assembly and the generator assembly are located as a secondary air inlet having an air intake area being smaller than that of a primary air inlet as a whole, and the left end and the upper end surface of the fuel tank (3) are mounted at an interval from the inner cavity surface of the housing (i), the lower part of the right end of the fuel tank (6) has a recess (13) which is integrally recessed upwards and used for forming an air flow convergence zone chamber with a space expanding on the air flow path with the air deflector (10).

6. The method according to claim 1, wherein the air deflector (10) has a radiation proof material on its surface, and the radiation proof material is a felt composite aluminum foil thermal insulation mat (14).

7. The method according to claim 2, wherein the engine assembly comprises an engine case (23) horizontally provided on an inner bottom surface of the lower housing (1) in the high-temperature zone, wherein the left end of the engine case (23) is a hand-pulled tray fan (7), an air filter (24) is provided below the hand-pulled tray fan (7), and a carburetor (25) is provided above the hand-pulled tray fan (23).

8. The method according to claim 7, wherein an engine cylinder head (26) is provided on an upper part of the engine case (23), and a high-pressure pack (27) is provided on the engine cylinder head (26).

9. The method according to claim 7, wherein the generator assembly is provided at the right end of the engine case and comprises a generator shell (28) with a left end butted to the right end face of the engine case (23) and a generator fan (8), a generator rotor (30) and a generator stator (31) provided in the generator shell (28), and a generator air inlet (32) is further provided at a position where the right end face of the housing (1) faces the generator assembly; the generator air inlet (32) achieves air intake through abutting a generator air guide port rubber sleeve (33) and an opening at the right end of the generator shell (28); a grid-shaped generator air inlet cover plate is fixedly mounted at the generator air inlet (32) by means of a screw; the left end of the generator air guide port rubber sleeve (33) has a vertical generator abutting surface and abuts on the right end of the generator shell; the right end of the generator air guide port rubber sleeve (33) has a vertical generator air inlet cover plate abutting surface and abuts on the left end of the generator air inlet cover plate, and the middle part of the generator air guide port rubber sleeve (33) has a circle of convex projection.

10. The method according to claim 9, wherein the generator assembly further comprises a generator fan (8) provided within the generator shell (28) at a left end of the generator rotor (30) and the generator stator (31).

\* \* \* \* \*